United States Patent [19]

Lamkemeyer

[11] 3,708,201
[45] Jan. 2, 1973

[54] BICYCLE SADDLE

[75] Inventor: Klaus Lamkemeyer, Guetersloh, Germany

[73] Assignee: Mertens & Co. Kommandltgesellschaft, Guetersloh-Westfalen, Germany

[22] Filed: Jan. 15, 1971

[21] Appl. No.: 106,783

[30] Foreign Application Priority Data

March 2, 1970 Germany............G 70 07 538.6

[52] U.S. Cl..................................297/214, 297/195
[51] Int. Cl.............................B62j 1/18, B62j 1/04
[58] Field of Search ....297/195, 214; 287/64; 248/73

[56] References Cited

UNITED STATES PATENTS

| | | | |
|---|---|---|---|
| 3,604,748 | 9/1971 | Lankemeyer | 297/214 |
| 1,802,964 | 4/1931 | Brady | 248/73 |
| 2,937,690 | 5/1960 | Hedstrom | 297/203 X |
| 2,244,956 | 6/1941 | Miller et al. | 297/214 |
| 3,432,204 | 3/1969 | Brilando | 297/214 |
| 3,586,369 | 6/1971 | Worley | 297/195 |
| 3,588,171 | 6/1971 | Rich | 297/195 |

Primary Examiner—James T. McCall
Attorney—Steinberg & Blake

[57] ABSTRACT

A bicycle saddle has a metal plate body and a foam rubber covering for the plate body surrounding it and extending between it and an envelope. The plate body is supported at its rear end by coil springs fastened to longitudinal bridge members, the front ends of which have heads engaging in slots in the front or neck part of the plate body to form bayonet joints. The envelope is turned under at the rear and neck ends of the saddle, and secured to the foam covering together with the plate during the foaming operation.

6 Claims, 5 Drawing Figures

PATENTED JAN 2 1973  3,708,201

Inventor:
Klaus Lamkemeyer
by Steinberg + Blake
Attorneys

BICYCLE SADDLE

The present invention concerns a bicycle saddle comprising a support means and a cushion of foam rubber connected thereto during manufacture.

The object of the present invention is to provide a simply constructed, economically produced bicycle saddle which is efficiently upholstered particularly in the region of the saddle neck.

Another object of the present invention is to provide a bicycle saddle comprising saddle bridges which can be economically, simply readily and reliably secured to the saddle neck.

In a preferred embodiment, the supporting member is provided in the rear portion of the saddle with securing members such as screws and, in the region of its neck has an inverted U-shaped cross section, with lateral insertion openings for two saddle bridges secured by means of screw connections and a kind of bayonet fitting, and at least one aperture for the foam material. The supporting member is covered as supporting means by a separate envelope of plastics material or rubber, having a wall drawn inwardly peripherally relatively to the neck of the supporting body and the envelope is connected to the cushion body during its preparation.

It is preferable to provide each saddle bridge near the neck of the saddle with at least one retaining head formed in one piece therewith and as a part of a bayonet connection, which head is directed outwardly substantially at a right angle to the plane of the saddle bridge and engages through an opening in the saddle neck forming the second part of the bayonet connection, whereby the saddle bridge is detachably connected to the wall of the saddle neck, but secured against inadvertent detachment.

Such a bicycle saddle may be made as a lady's, gentleman's or child's saddle and may be designed with any desired seat shape; this saddle is particularly suitable for cycles, mopeds, childrens' toys, seats of tractors, golf cars or lawn mowers.

The separate envelope is simple and economical to manufacture and, after the insertion of the supporting means, can be formed by the foaming of the cushion as a unit connected together during manufacture.

The foam material extends through the entire inner space between the envelope and the supporting means, so that, particularly in the neck region, complete upholstery (at the top, sides, front and below) of the saddle neck is achieved and hard pressure points are avoided; furthermore, this envelope neck contributes in locating the supporting body within the envelope before the foaming of the cushion.

Due to the envelope wall being drawn in around the neck of the supporting plate, the saddle bridges can be secured in the neck region from the inside.

In addition, the saddle of the present invention is preferably equipped with simply designed, easily mounted and securely positioned saddle bridges which are attached to the supporting means in the region of the saddle neck by one end, without separate auxilliary means.

Since the saddle bridges are secured in the region of the saddle neck by a bayonet-like connection, interchanging of the saddle bridges is simple, and assembly and dismantling takes very little time.

An embodiment of the invention is illustrated in the drawings in which.

Figure 1:
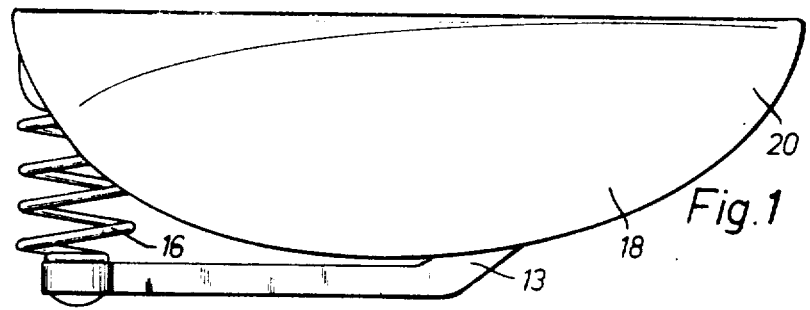
FIG. 1 is a side view of a bicycle saddle.
Figure 2:
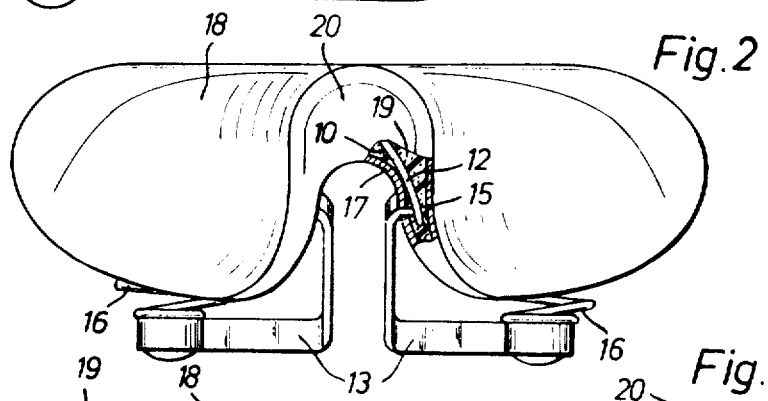
FIG. 2 is a front view of the same bicycle saddle, shown partly in section.
Figure 3:
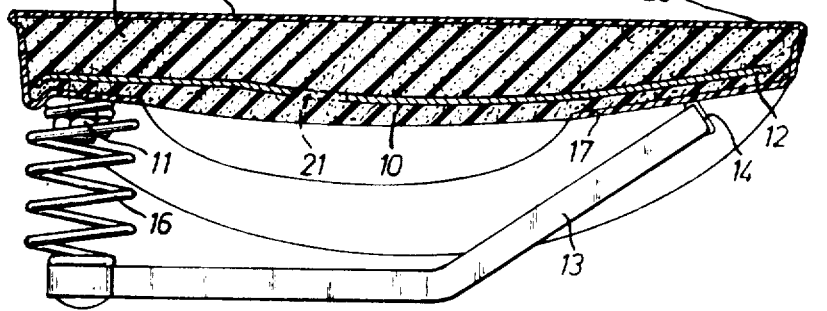
Figure 4:
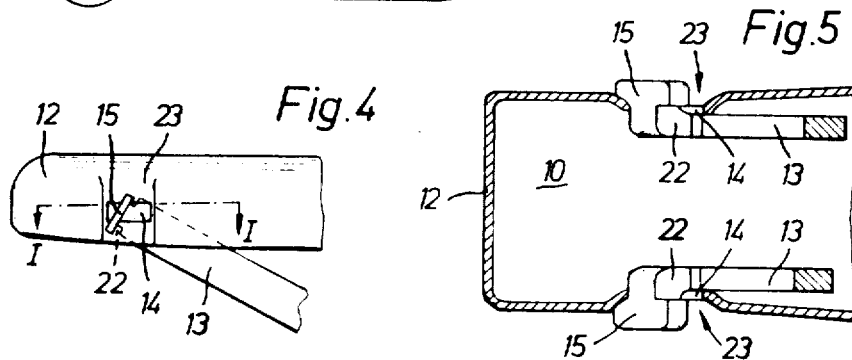
Figure 5:
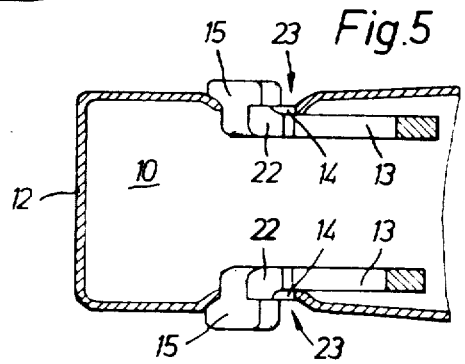

FIG. 3 is a longitudinal section through the same bicycle saddle showing an envelope enclosing a rigid supporting body, and a foamed cushion between the envelope and the supporting body, FIG. 4 is a side view of the area near the neck of the saddle showing the attachment of the saddle bridge to the supporting body, FIG. 5 is a longitudinal section through the area near the neck of the saddle showing the attachment of the saddle bridges, taken on the line 1 — 1 of FIG. 4.

A bicycle saddle according to the present invention is provided with a supporting means 10 formed as a single rigid support plate or as a multi-part support means 10 consisting of a front saddle neck, a rear cross-bar and interposed springs, said support means being connected to saddle bridges 13 to form a unit.

In the embodiment shown in the drawings, the support means is a rigid support body 10 which in the rear portion of the saddle has downwardly extending bolts 11 formed out of the supporting body 10 or fixed thereon. In the region of its forwardly extending neck 12 it has an inverted U-shaped cross section with lateral insertion openings 14 for two saddle bridges 13 which are detachably connected to the support body 10. The two saddle bridges 13 are secured at one end with a bayonet-like connection to the neck 12 by bridge members 15 engaging in the openings 14, and at the other end to the support body 10 in the rear of the body via helical springs 16. Each spring 16 is secured at one end to the bolts 11 and at the other end to the saddle bridges 13 by means of screws or rivets.

The support body 10 is enclosed by a separate envelope 18 of plastics material or rubber, having a wall 17 drawn inwardly near the saddle neck 12 correspond to the shape of the neck.

In order to impart a cushioning effect to the saddle, a cushion 19 of foam rubber is formed between the support body 10 and envelope 18, said cushion becoming connected during foaming to the envelope 18 and the support body 10.

The envelope 18, which is spaced from the support body 10 encloses the edge of the support body at the rear and the sides, and is formed in the region of the neck of the saddle as a saddle neck 20 enclosing a space having an inverted U-shaped cross section so that this envelope neck 20 completely encloses the support body neck 12.

The support body 10 is embedded by the foam in the cushion 19 and the cushion extends between the support body 10 and envelope 18, and also below the support body 10, so that the envelope encloses and cushions the support body 10 on all sides.

For the introduction of the foam material and for better anchorage of the support body 10 in the cushion 19, the body 10 is provided with at least one aperture 21 and one or more beads (not shown). This provides increased connecting surfaces between the support body 10 and foam cushion 19.

The areas of envelope in the vicinity of the insertion openings 14 in the neck are open on the inside of the neck and allow the insertion of the bar-like ends of the saddle bridge away from the springs 16.

The envelope 18 may be produced by blowing, centrifuging or injection molding, in one piece.

Each saddle bridge 13 is secured with a bayonet-like connection to the saddle neck 12 at its end near the saddle neck. The receiving openings 14 are formed in the side walls of the cap-like saddle neck 12, the longitudinal sides of each receiving opening 14 extending in the longitudinal direction of the saddle and parallel to the upper edge of the saddle neck. The preferred form of the openings 14 is rectangular, but they may also be oval or slot-like.

Each saddle bridge 13 has a retaining head 15 at one end which is at an angle to the longitudinal direction of the saddle bridge and longitudinal plane thereof and is formed in one piece with the saddle bridge 13.

The retaining head 15 is made thinner than the receiving openings 14, but it may have any form so long as it is possible to insert the retaining head 15 through the receiving aperture 14.

It is preferable to form the retaining head 15 and the receiving opening 14 to conform with each other; in the angled region of the retaining head 15 each saddle bridge 13 is provided with at least one recess 22, which keeps the retaining head 15 at a space from the longitudinal plane of the saddle bridge and enables the saddle bridge 13 to turn in the receiving opening 14. At the recess 22 the bridge is bent at an angle to the longitudinal plane of the saddle bridge, the bend terminating in the retaining head 15.

The two saddle bridges 13 are formed at their saddle neck ends in such manner that a certain portion of the bridge is bent at an angle and two lateral recesses 22 are formed in the angled portion, leaving a neck supporting the retaining head 15, said retaining head 15 corresponding in width to the width of the bridge and forming a T-shape with the neck supporting it.

The retaining head 15 is made longer than the width of the receiving opening 14 so that the retaining head 15 can be disposed in contact with the wall of the saddle neck on both sides of the receiving opening 14 and thus reliably secures the saddle bridge 13 from inadvertent detachment.

To assemble the individual saddle bridges 13, the retaining heads 15 thereof are aligned so that the heads 15 and the receiving openings 14 coincide, whereupon the heads 15 can be slipped through the receiving openings 14.

Each saddle bridge 13 is then turned so that the retaining head 15 extends transversely to the receiving opening 14; the retaining head 15 in contact with the outer surface of the saddle neck, holds the saddle bridge 13, now extending in the longitudinal direction of the saddle, against the inner surface of the saddle neck and the other end of the saddle bridge 13 is secured by means of the screw or rivet connection 11 to the supporting body 10, so that each saddle bridge 13 is simply and reliably secured to the supporting means.

The design of the retaining head 15 on each saddle bridge 13 may also be provided with a recess 22 in the cranked bridge member so that only a unilateral retaining head 15 is in contact with the outside of the saddle neck 12 to prevent inadvertent detachment of the saddle bridge 13.

It is also preferable to draw in the side walls of the saddle neck 12 in the region of the receiving openings 14 towards the longitudinal center plane of the neck, so that a depression 23 is produced in which the retaining head 15 is located.

The depression 23 may be large enough for the retaining head 15 to have its outer edge in the same plane as the outer surface of the saddle neck.

I claim:

1. A bicycle saddle comprising a supporting means and a cushion body of foam material connected therewith, a front neck having an inverted U-shaped cross section, on said supporting means, said neck being formed with elongated lateral insertion openings, two saddle bridges releasably secured to said supporting means at said neck openings by a bayonet type closure, each saddle bridge having at least one retaining head formed thereon in the region of said saddle neck to form a first part of a bayonet connection, said head extending outwardly at a right angle to the plane of the saddle bridge and engaging through said opening formed in said saddle neck and forming the second part of said bayonet connection, said head being elongated and extending angularly beyond said opening after engaging through said opening, whereby said saddle bridge is detachably and tiltably secured to the wall of said saddle neck, but prevented from inadvertent detachment.

2. A bicycle saddle as recited in claim 1, said supporting means being formed with 6 aperture receiving a portion of said cushion body, and an envelope of plastics material with a wall drawn inwardly peripherally around said neck of said supporting body, said envelope being connected to said cushion body during the foaming of said cushion body, said envelope having a saddle neck enclosing a space having an inverted U-shaped cross section and surrounding said neck of said supporting body.

3. A bicycle saddle as defined to claim 1, wherein said retaining head is T-shaped and is bent outwardly to form a right angle with the plane of said saddle bridge.

4. A bicycle saddle as recited in claim 1, characterized by the feature that the side walls of said saddle neck are drawn in towards the center longitudinal plane of said saddle neck in the region of said openings to form recesses for said retaining heads.

5. A bicycle saddle as recited in claim 1 and wherein said cushion body is formed in the region of each opening with a recessed portion for receiving said head.

6. A bicycle saddle as recited in claim 5 and wherein an envelope covers said cushion body and is itself formed with openings aligned with said neck openings for facilitating insertion of said retaining heads.

* * * * *